(12) United States Patent
Grossman et al.

(10) Patent No.: US 12,063,720 B2
(45) Date of Patent: Aug. 13, 2024

(54) PROCESSES FOR FORMING TRANSPARENT, CONDUCTIVE FILMS FROM HEAVY HYDROCARBONS, AND DEVICES AND SYSTEMS INTO WHICH SUCH FILMS ARE INCORPORATED

(71) Applicants: Massachusetts Institute of Technology, Cambridge, MA (US); ExxonMobil Technology and Engineering Company, Annandale, NJ (US)

(72) Inventors: Jeffrey Grossman, Brookline, MA (US); Brent Keller, Cambridge, MA (US); Owen Morris, Cambridge, MA (US); Mark Disko, Glenn Gardner, NJ (US); Heather Elsen, Bethlehem, PA (US); Xining Zang, Cambridge, MA (US); Nicola Ferralis, Cambridge, MA (US); Ximena Hasbach, Boston, MA (US)

(73) Assignees: Massachusetts Institute of Technology, Cambridge, MA (US); ExxonMobil Technology and Engineering Company, Annandale, NJ (US)

( * ) Notice: Subject to any disclaimer, the term of this patent is extended or adjusted under 35 U.S.C. 154(b) by 656 days.

(21) Appl. No.: 16/901,778

(22) Filed: Jun. 15, 2020

(65) Prior Publication Data
US 2020/0396799 A1    Dec. 17, 2020

Related U.S. Application Data

(60) Provisional application No. 62/861,704, filed on Jun. 14, 2019.

(51) Int. Cl.
*H05B 3/14*     (2006.01)
*B23K 26/351*   (2014.01)
(Continued)

(52) U.S. Cl.
CPC ............ *H05B 3/14* (2013.01); *B23K 26/351* (2015.10); *B29C 39/02* (2013.01); *B29C 71/02* (2013.01);
(Continued)

(58) Field of Classification Search
CPC ....... B23K 26/351; B29C 39/02; B29C 71/02; B29C 2071/022; B29K 2095/00;
(Continued)

(56) References Cited

U.S. PATENT DOCUMENTS 6,660,978 B1 * 12/2003 Avdeev ................. H05B 3/342
                                                            219/548
2008/0116109 A1   5/2008 McCoy et al.
(Continued)

FOREIGN PATENT DOCUMENTS

| CN | 106686778 A | * | 5/2017 | ............... H05B 3/02 |
| DE | 202009018502 U1 | * | 2/2012 | ............... H05B 3/84 |
| ES | 2281353 T3 | * | 10/2007 | ........ A47J 27/21041 |
| KR | 20150129108 A | * | 11/2015 | |
| WO | WO-2012150834 A2 | * | 11/2012 | ............. B82Y 30/00 |

OTHER PUBLICATIONS

Brown, Heavy hydrocarbon fate and transport in the environment, Jun. 15, 2017, Quarterly Journal of Engineering Geology and Hydrogeology, vol. 50, pp. 333-346 (Year: 2017).*
(Continued)

*Primary Examiner* — John J Norton
*Assistant Examiner* — Franklin Jefferson Wang
(74) *Attorney, Agent, or Firm* — Barnes & Thornburg, LLP (57) ABSTRACT

The present disclosure is directed to processes for forming or otherwise creating a transparent, conductive film from a
(Continued)

heavy hydrocarbon material. It allows for what is often considered to be waste material to be transformed into a useful product, such as a heating element. Such heating elements can be incorporated into many contexts where it can be important to have transparency and/or a thin heating element, such as in windshields. The process involves dissolving a heavy hydrocarbon material in a solvent, casting the heavy hydrocarbon solution that results from the dissolving onto a substrate to form a film, and then annealing the film. The disclosure also provides for objects in which such resulting films can be used, such as Joule heaters.

20 Claims, 2 Drawing Sheets

(51) Int. Cl.
| | | |
|---|---|---|
| | B29C 39/02 | (2006.01) |
| | B29C 71/02 | (2006.01) |
| | B29K 95/00 | (2006.01) |
| | B82Y 30/00 | (2011.01) |
| | B82Y 40/00 | (2011.01) |
| | H05B 3/03 | (2006.01) |
| | H05B 3/34 | (2006.01) |
| | H05B 3/84 | (2006.01) |

(52) U.S. Cl.
CPC ............... *H05B 3/03* (2013.01); *H05B 3/34* (2013.01); *H05B 3/84* (2013.01); *B29C 2071/022* (2013.01); *B29K 2095/00* (2013.01); *B82Y 30/00* (2013.01); *B82Y 40/00* (2013.01); *H05B 2203/013* (2013.01)

(58) Field of Classification Search
CPC .... H05B 3/14; H05B 2203/013; H05B 3/145; H05B 3/146; H05B 3/16; H05B 3/03; H05B 3/34; H05B 3/84; B82Y 30/00; B82Y 40/00
See application file for complete search history.

(56) References Cited

U.S. PATENT DOCUMENTS

| | | | | |
|---|---|---|---|---|
| 2010/0187482 A1* | 7/2010 | Mullen | ................ | C09D 5/24 |
| | | | | 252/502 |
| 2011/0159372 A1* | 6/2011 | Zhamu | ................ | H01G 11/50 |
| | | | | 429/232 |
| 2011/0165321 A1* | 7/2011 | Yu | ................ | H01G 11/46 |
| | | | | 427/79 |
| 2012/0301816 A1* | 11/2012 | Lee | ................ | C01B 32/205 |
| | | | | 977/734 |
| 2013/0243965 A1* | 9/2013 | Choi | ................ | B82Y 40/00 |
| | | | | 427/504 |
| 2014/0120030 A1* | 5/2014 | Kim | ................ | B82Y 30/00 |
| | | | | 977/734 |
| 2015/0266739 A1* | 9/2015 | Zhamu | ................ | C01B 32/182 |
| | | | | 428/408 |
| 2017/0318625 A1* | 11/2017 | Bouchiat | ................ | H05B 3/84 |
| 2018/0061517 A1* | 3/2018 | Zhamu | ................ | H01B 1/04 |
| 2018/0105952 A1* | 4/2018 | Jo | ................ | C30B 28/02 |

OTHER PUBLICATIONS

Wang et al. Anal. Chim. Acta. 2007, 602(2) 211-222.
Wang et al. RSC Adv. 2015, 5(119) 98412.
Wood Mackensie Chemicals. Ethylene Global Supply Demand Analytics Service—Apr. 2018, 2018.
Wuebbles et al., "Climate science special report: fourth Na-tional Climate Assessment," U.S. Global Change Research Program. 2017. 1 470.
Yang. Environ. Sci. Technol. 2015, 49(16) 9501-9502.
Ye et al. Am. Chem. Res. 2018, 51(7) 1609-1620.
Yoon et al. Adv. Mater. 2007, 19(23) 4284.
Zhai et al. J. Sun. Nano Res. 2016, 9(12) 3924-3936.
Zhang et al. RSC Adv. 2018, 8(26) 14532-14538.
Celle et al. Nano Res. 2012, 5(6) 427-433.
Chung et al, "Electrical applications of carbon materials," Journal of Materials Science. 2004. 39(8) 2645-2661.
D. C. Choo, T. W. Kim. Sci. Rep. 2017, 7, 1 1.
Davis et al. Philos. Mag. A J. Theor. Exp. Appl. Phys. 1970, 22(179) 903-922.
Ferralis et al. Carbon. 2015, 88 139-147.
Ferrari et al. Phys. Rev. B. 2000, 61(20) 14095.
Ferrari et al. Phys. Rev. B. 2001, 64, 75414.
Goode et al. Langmuir. 2015, 31(23) 6267-6276.
Gueye et al. ACS Appl. Mater. Interfaces. 2017, 9(32) 27250-27256.
Guillén et al. Fuel. 1996, 75(9) 1101-1107.
Gupta et al. ACS Appl. Mater. Interfaces 2014, 6(16) 13688.
Gupta et al. ACS Applied Materials and Interfaces. 2016, 8(20) 12559-12575.
He et al. Materials (Basel). 2017, 10(3) 220.
Huang et al. RSC Adv. 2015, 5(57) 45836.
Hudaya et al. ECS Trans. 2013, 53(4) 161.
IPCC, Climate Change 2014: Synthesis Report. 2014.
J. Schwan, S. Ulrich, V. Batori, H. Ehrhardt, S. R. P. Silva. J. Appl. Phys. 1996, 80, 120 1611.
Jang et al. Carbon N. Y. 2011, 49(1) 111.
Kan et al. Energy & Fuels. 2012, 26(6) 3604-3611.
Kang et al. Carbon. N. Y. 2011, 49(4) 1087.
Kang et al. Nano Lett. 2011, 11(12) 5154-5158.
Keller et al. Nano Letters. 2016, 16(5) 2951-2957.
Kim et al. Adv. Funct. Mater. 2013, 23(10) 1250.
Kiruthika et al. RSC Adv. 2014, 4(91) 49745.
Kuhner, G.; Manfred, V. Carbon Black Science and Technology. CRC Press, 1993.
Kumar et al. Renew. Sustain. Energy Rev. 2016, 58 976-1006.
Leahy et al. Sensing and Bio-Sensing Research. 2015, 6 25-27.
Lee et al. Curr. Appl. Phys. 2012, 12(4) 113.
Li et al. Macromolecular Materials and Engineering. 2014, 299(11) 1403.
Lin et al. Nature Communications. 2014, 5 1.
Liu et al. Carbon. 2016, 101 361-367.
Lordan et al. ACS Appl. Mater. Interfaces. 2017, 9(5) 4932.
Minco. Thermal-ClearTM transparent heaters. https://www.minco.com/~/media/files/minco/productguides/heat/. Accessed: Mar. 19, 2019.
Morris, O., et al., "Natural carbon by-products for transparent heaters: the case of steam cracker tar,".
Morris, O., et al., "Steam cracker tar: negative cost feedstock for transparent joule heaters,".
Nishio. Phys. Chem. Chem. Phys. 2011, 13(31) 13873-13900.
R. Ye, C. Xiang, J. Lin, Z. Peng, K. Huang, Z. Yan, N.P. Cook, E.L.G. Samuel, C .-c. Hwang, G. Ruan, G. Ceriotti, A .-r. D. Raji, J.M. Tour, A.A. Mart. Nat. Commun. 2013, 4, 2943 1.
Ravi et al., "Sustainable carbon nanomaterials: Recent advances and its applications in energy and environmental remediation," Journal of Environmental Chemical Engineering. 2016. 4(1) 835-856.
Risoul et al. J. Hazard. Mater. 1999, 64(3) 295-311.
Robertson et al. Physical Review B. 1987, 35(6) 2946.
Robertson. Adv. Phys. 1986, 35(4) 317-374.
Robertson. Progress in Solid State Chemistry. 1991, 21(4) 199-333.
Ruiz-Morales et al. Energy and Fuels. 2007, 21(2) 944-952.
S. Wang, X. Zhang, W. Zhao. J. Nanomater. 2013, 2013, 3 1.
Shames et al. International Journal of Energy Efficient Vehicle Designs. 2013, 15(2) 1114.
Solomon et al. Fuel. 1984, 63(9) 1302-1311.
Sui et al. Small. 2011, 7(22) 3186-3192.
Tauc et al. Phys. Status Solidi. 1966, 15 627.
Transparent Products, Inc. CrystalHeat R• LCD heaters. https://www.touchpage.com/wp-content/uploads/2018/12/CrystalHeat_Datasheet.pdf. Accessed: Mar. 19, 2019.

(56) References Cited

OTHER PUBLICATIONS

V. Oja, E. M. Suuberg. ACS Analytical Chemistry. 1997, 69, 4619-4626.

* cited by examiner

PROCESSES FOR FORMING TRANSPARENT, CONDUCTIVE FILMS FROM HEAVY HYDROCARBONS, AND DEVICES AND SYSTEMS INTO WHICH SUCH FILMS ARE INCORPORATED

CROSS REFERENCE TO RELATED APPLICATION

The present disclosure claims priority to U.S. Provisional Application No. 62/861,704, entitled "Processes for Forming Transparent, Conductive Films from Heavy Hydrocarbons, and Devices and Systems into Which Such Films are Incorporated," which was filed on Jun. 14, 2019, and which is incorporated by reference herein in its entirety.

FIELD

The present disclosure relates to processes for forming transparent, conductive films, and the films and resulting devices and systems that result from the same, and more particularly relates to processes for turning heavy hydrocarbon material into a useful heating element. These heavy hydrocarbons may include both virgin (unprocessed) and processed streams, which are often waste material (e.g., material such as steam cracker tar that results from ethane processing).

BACKGROUND

With innovations in technology and processing capacity increasing year over year, worldwide dependence on consumer electronics and other devices that take advantage of this technological progress continues to reach all-time highs. Simultaneously, however, this increase in production has led to a proportional increase in production of byproducts of the materials that are used in the manufacture of these devices. Natural carbons, such as coal and petroleum feedstocks, or the undesirable byproducts of subsequent chemical processing of these feedstocks, such as tars, comprise a huge chemical phase space incorporating a wide range of chemical, optical and electronic properties. For example, while ethylene, which is a raw material used in the manufacture of polymers that is used to meet the global demand for consumer electronics and in a wide variety of industrial and consumer markets such as the packaging, transportation, electrical/electronic, textile, and construction industries, as well as consumer chemicals, coatings, and adhesives, has increased rapidly, the production of steam cracker tar (SCT), which is one of the main byproducts of ethylene production, has increased on the scale of about >150×10$^6$ tons/year globally. These byproducts frequently have few useful applications, which leads to the need for its costly disposal or burning at the boiler plant. Most often these carbonaceous materials, whether from natural feedstock or industrial waste, are burned, with an associated generation of greenhouse gases. This increases production costs are often passed on to the consumer, and can also create many costly economic and environmental harms.

To date, the discovery of new uses for SCT has been limited. One reason has been the lack of understanding of the material itself. SCT is a complex material primarily consisting of polycyclic aromatic hydrocarbons (PAHs) containing one to five rings, polymerized along a backbone similar to polystyrene when the aromatic residuals from the steam cracking process are quenched, and may also include unpolymerized PAHs such as pyrene. Although complex and highly heterogeneous in nature, the molecular composition of SCT are that of a heavy hydrocarbon, meaning it is difficult to manipulate and process. Further, the exact composition of the SCT as a byproduct can depend on the specific feedstock used in the steam cracker. In some instances, the SCT is cut with vacuum gas oil (VGO) to decrease its viscosity for transport away from the steam cracker, producing a mixture known as fluxed SCT. The VGO can later be distilled off, leaving a defluxed SCT. These differences in composition and chemical diversity of the SCT as a byproduct, as well as the sheer volume in which it is produced, has restricted its use in applicability in long-lifetime, potentially high-value products due to perceived costs of manipulation when compared to single-use burning.

Accordingly, there is a need for methods of processing materials such as byproducts of chemical processing feedstocks that provide useful applications in optics and/or electronics that would benefit the producer while minimizing corresponding emissions of greenhouse gases.

SUMMARY

The present application is directed to methods of processing a material such that the material can be used as a conductive element. In at least some instances, the processed material is a byproduct from another process, device, or system, and, in view of the present disclosures, the byproduct is turned into something new and useful. For example, the byproduct can be turned into a thin, conductive film that can be used as a Joule heater. The films, in at least some instances, can be transparent. Such Joule heaters can be incorporated into a variety of applications where a thin heating element is desirable, which can include applications where transparency and/or the ability to melt (e.g., ice) can be important, at least some of which are described herein. By way of non-limiting examples, such Joule heaters can be incorporated into: windows, such as car windshields and windows in buildings or other structures; a shell of an airplane (i.e., the combination of the fuselage, wings, and horizontal and vertical stabilizers); the housings, exteriors, and/or related components of modes of transportation; or screens or displays, such as computer and television screens/monitors/displays, including but not limited to ones that are intended for outside use. The flexible nature of the resulting films also allows for their use, in conjunction with a Joule heater or otherwise, in a variety of other industries, fields, and applications, as detailed further below.

This disclosure describes both a solution-based process developed for the processing of a heavy hydrocarbon, and application as a transparent conductor and Joule heater. The processing of these streams is one exemplary type of processing that can benefit from the present disclosures, but as provided for herein, more broadly the processes described herein can be applicable to at least any heavy hydrocarbon(s), where a heavy hydrocarbon is a hydrocarbon material or hydrocarbon stream having a boiling point that is approximately 340 degrees Celsius or higher. In addition to the tar created in the process of ethylene steam cracking that is described herein, other streams that can be used in conjunction with the present disclosures include but are not limited to atmospheric resids (residuum), vacuum resids, bitumen, deasphalter bottoms, rock, asphalt, pitch, FCC bottoms, cracker bottom, coker bottoms, fuel oil, bunker, asphalatenes, koln pot bottoms, or any other fractionated or processed hydrocarbon stream that includes molecules with boiling points approximately 340 degrees Celsius or higher. The material can come, for example, from a feedstock, including from both virgin (unprocessed) and processed streams. The general purpose of the developed process is to produce thin conductive films of the carbon material, with the ability to control the thickness, conductivity, and transparency through the process parameters. The solution-based process represents the first processing of this carbon feedstock for electronic applications. The solution-based method allows facile scaling of the process to an industrial scale with little increased capital cost.

The processed material has a wide variety of potential applications. These include, by way of non-limiting examples, transparent resistive heating for applications such as de-icing for vehicles, sample processing and cleaning in biomedical devices, and transparent conductive films for applications such as cell phone touchscreens, photovoltaic devices, and smart glass windows.

The processes provided for utilize steps of dissolving the material (e.g., heavy hydrocarbon) in a solvent, casting the solution that results from dissolving onto a substrate to form a film, and then annealing the film. As described herein, various parameters associated with the material, the solvent, and the processing steps can be adjusted to produce desirable results for the film related to one or more of a transparency, conductivity, thickness, smoothness, or amount of power needed to operate the film as a heating element, among other properties of the resulting film that can be controlled via the disclosed processes.

In one exemplary embodiment of a method for producing a film, the method includes dissolving a heavy hydrocarbon material in a solvent to form a heavy hydrocarbon solution, casting the heavy hydrocarbon solution onto a substrate to form a film, and annealing the film.

The heavy hydrocarbon material can have one or more molecules with a boiling point of approximately 340 degrees Celsius or greater. In at least some instances, the heavy hydrocarbon material can include one or more petroleum byproducts, such as steam cracker tar.

The solvent can include a liquid in which the heavy hydrocarbon material is soluble. In some such instances, the liquid can include dichloromethane and/or dichlorobenzene.

The action of casting the heavy hydrocarbon solution can be performed using a variety of techniques. These techniques include, but are not limited to: spin-coating, spraying, blade casting, line casting, drop casting, solution casting, inkjet printing, or Mayer/wound rod rolling the heavy hydrocarbon solution onto a substrate. Such techniques can be performed as standalone techniques, or they can be performed in conjunction with other techniques, in any order and/or simultaneously. In some exemplary embodiments, spin-coating is at least one of the techniques, or is the only technique, used to cast the heavy hydrocarbon solution onto a substrate.

The action of annealing the film can also be performed using a variety of techniques. These techniques include, but are not limited to: heating a local atmosphere in which the film is disposed or operating a laser to contact the film to cause the film to anneal. Such techniques can be performed as standalone techniques, or they can be performed in conjunction with other techniques, in any order and/or possibly simultaneously. Annealing the film can occur at a temperature approximately at or greater than about 600 degrees Celsius.

The method can further include forming at least one conductive pattern in the annealed film. This action can be performed, for example, by operating a laser. The resulting at least one conductive pattern can be an arbitrarily complex pattern.

In some embodiments the method can include incorporating one or more additives into the film to improved conductivity of the film. The additives can be added before or after any of the dissolving, casting, and annealing actions, as well as before or after forming a conductive pattern in the annealed film.

The method can further include adjusting one or more parameters of the heavy hydrocarbon solution to adjust a thickness of the film. These parameters include, but are not limited to, a concentration of the hydrocarbon solution, a viscosity of the hydrocarbon solution, and/or a type of the solvent used in forming the hydrocarbon solution.

Alternatively, or additionally, the method can further include adjusting one or more parameters associated with casting the heavy hydrocarbon solution onto a substrate. These parameters include, but are not limited to, a concentration of the hydrocarbon solution, a rotation speed of a casting device that casts the heavy hydrocarbon solution onto the substrate, an acceleration speed of a casting device that casts the heavy hydrocarbon solution onto the substrate, a speed at which the substrate moves with respect to a speed at which a casting device that casts the heavy hydrocarbon solution onto the substrate moves, an applied pressure on the hydrocarbon solution as applied by a casting device that casts the heavy hydrocarbon solution onto the substrate, dimensions of a casting device that casts the heavy hydrocarbon solution onto the substrate, and/or a configuration of a casting device that casts the heavy hydrocarbon solution onto the substrate. Within the context of the previous sentence, the casting device can be the same casting device, or it can be different casting devices, depending on the configuration of the set-up and preferences of the operator of the set-up.

Still further, alternatively, or additionally, the method can further include adjusting one or more parameters associated with annealing the film. These parameters include, but are not limited to, a temperature of an environment in which the annealing occurs, a length of time for which the annealing occurs, a heating and/or cooling rate for the film, and/or a surrounding environmental pressure.

In various embodiments, the resulting film can be a substantially smooth and/or a substantially homogeneous film. In some embodiments, the resulting film can have a transparency that is at least approximately 70%. In some embodiments, the resulting film can have a sheet resistance that is approximately 30,000 ohms per square or less. In some embodiments, the resulting film can have an energy density that is at least approximately 4.3 J/m$^2$. Such embodiments provided for in this paragraph can be standalone embodiments, or they can be combined (e.g., in some embodiments, the resulting film can be have a transparency that is at least approximately 70% and a sheet resistance that is approximately 30,000 ohms per square or less).

In one exemplary embodiment of a Joule heater, the heater includes a substrate and a thin, conductive film coupled to the substrate. The film includes a heavy hydrocarbon (or more than one). A transparency of the film is at least approximately 70%, and a sheet resistance of the film is approximately 30,000 ohms per square or less.

The Joule heater can include one or more electrodes coupled to the film. Such electrode(s) can be configured to raise in temperature when a voltage is placed across the electrode(s). Other means by which voltage can be passed across can also be used, such means being within the knowledge of the skilled person in the art (e.g., leads).

The heavy hydrocarbon can have one or more molecules with a boiling point of approximately 340 degrees Celsius or greater. In at least some instances, the heavy hydrocarbon material can include one or more petroleum byproducts, such as steam cracker tar.

The film can have at least one conductive pattern formed in it. The pattern(s) can be, for example, a laser-formed arbitrarily complex pattern. The film can include one or more additives disposed in the film. The additive(s) can be configured to increase conductivity of the film.

The film can be substantially smooth and/or substantially homogeneous. A thickness of the film can be approximately in the range of about 10 nanometers to about 500 nanometers. A transparency of the film can be at least approximately 85%. An energy density of the film can be at least approximately 4.3 J/m$^2$. These properties of the film can be stand-alone properties, or they can co-exist in any combination.

In some embodiments, an output temperature of the Joule heater can be approximately in the range of about 100 degrees Celsius to about 288 degrees Celsius. Alternatively, or additionally, the Joule heater can be operated at approximately 60 Volts or less.

The Joule heater can be incorporated into a variety of objects. These objects can be those in which it can be particularly important to have good transparency (e.g., transparency of at least approximately 70%) and/or a thin construction of a heating element and/or a flexible construction of a heating element. For example, the Joule heater can be disposed in a windshield. By way of further example, the Joule heater can be disposed in at least one of a fuselage, wing, horizontal stabilizer, or vertical stabilizer of an airplane. By way of still further example, the Joule heater can be disposed in a window. By way of yet another example, the Joule heater can be disposed in a display (e.g., a computer or television screen, monitor, or display).

BRIEF DESCRIPTION OF THE DRAWINGS

This disclosure will be more fully understood from the following detailed description taken in conjunction with the accompanying drawings, in which:

FIGS. 1a-1d is a perspective view of one exemplary embodiment of a process flow diagram for fabrication of SCT films;

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent that the instant disclosure includes various terms for components and/or processes of the disclosed devices, systems, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, casting of a material onto a substrate is described as being done by spin-coating (or spin-casting) the material onto a substrate. A person skilled in the art, however, in view of the present disclosures will understand other ways by which the material can be associated with the substrate, whether such ways are explicitly stated herein. The present disclosure includes some illustrations and descriptions that include prototypes or bench models. A person skilled in the art will recognize how to rely upon the present disclosure to integrate the techniques, systems, devices, and methods provided for into a product in view of the present disclosures.

The present disclosure generally relates to systems, devices, and methods for processing petroleum byproducts to manufacture useful functional materials for optoelectronic technologies. In an exemplary embodiment, a material (e.g., steam cracker tar (SCT), although SCT is merely one example of a material to which the processes described herein can be applied) is processed by dissolving the carbon feedstock in an organic solvent, coating or otherwise casting the solution onto a suitable substrate, and then annealing the films at high temperatures. The combination of these actions can cause the film to be coupled to or otherwise associated with the substrate. The coating method, solvent, and concentration dissolved are among several parameters that can be adjusted to control the initial, and thus the final, thickness of the resulting film. The annealing can change the chemical structure of the material, providing improved conductivity and reducing the film thickness, leading to useful transparencies. For example, in some embodiments, films span the useful range of transparent heaters with temperatures up to about 279 degrees Celsius and transparencies up to about 93%. Additives may be incorporated into the film before and/or after the annealing step to improve the conductivity of the film. These films can then be incorporated into transparent heaters, e.g., Joule heaters, which can be fabricated by applying metal electrodes on top of the carbon film, and heat up when a voltage is placed across the electrodes. These Joule heaters can outperform more established materials such as reduced graphene oxide (rGO) and silver nanowires (AgNWs) in terms of maximum temperature, response time, ease of patterning, and materials costs.

Figure 1:
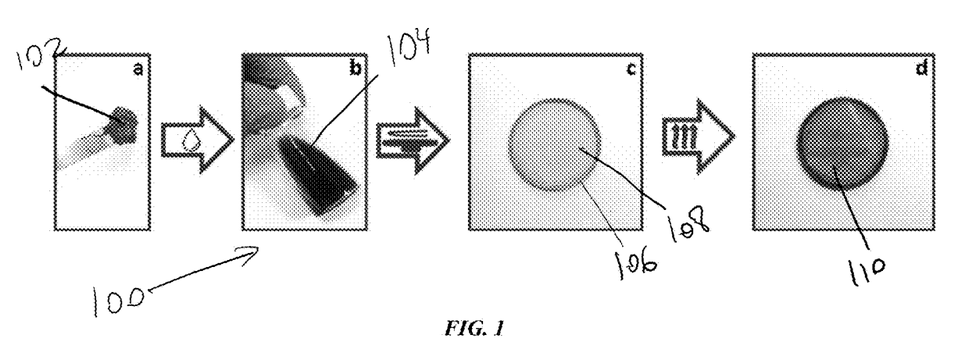

FIG. 1 illustrates an exemplary embodiment of a process flow 100 for fabrication of thin films by processing a carbon feedstock 102. As mentioned above, the carbon feedstock, such as SCT, has conventionally been a waste byproduct that is removed at cost from petrochemical processing plants at a scale far outpacing demand for its use. While the processed material described herein is primarily steam cracker tar (SCT) resulting from the processing of ethylene, and specifically high viscosity defluxed SCT, as shown in FIG. 1a, SCT is only one example of the type of materials with which the present disclosures are useful. More broadly, the present disclosure is applicable to heavy hydrocarbons, where a heavy hydrocarbon is a hydrocarbon material or hydrocarbon stream having molecules with a boiling point that is approximately 340 degrees Celsius or higher. Heavy hydrocarbons are often petroleum byproducts, and are often liquid, although some have very high viscosity at room temperature. Some non-limiting examples of materials with which the present disclosure can be used include atmospheric resids (residuum), vacuum resids, bitumen, deasphalter bottoms, rock, asphalt, pitch, FCC bottoms, cracker bottom, coker bottoms, fuel oil, bunker, asphalatenes, koln pot bottoms, or any other fractionated or processed hydrocarbon stream that includes molecules with boiling points approximately 340 degrees Celsius or higher.

As shown in FIG. 1b, the carbon feedstock 102, or heavy hydrocarbon, can be dissolved in a solvent (not shown), resulting in a heavy hydrocarbon solution 104. Two examples of such solvents are dichloromethane and dichlorobenzene, however, these are only two non-limiting examples, and a person skilled in the art, in view of the present disclosures, will understand any solvent capable of having a heavy hydrocarbon dissolved therein is suitable. Thus, a suitable solvent can be more aptly described as a solvent in which a heavy hydrocarbon material is soluble, and such solvents include but are not limited to dichloromethane and dichlorobenzene. Further, the solvent need not be a single material, and can include a plurality of materials that, when combined, are capable of dissolving a heavy hydrocarbon.

Parameters that can be adjusted to impact the film that results from dissolving a heavy hydrocarbon(s) in a solvent(s) to form a heavy hydrocarbon solution include, but are not limited to, a concentration of the heavy hydrocarbon in the solvent (i.e., a ratio of the amount of the heavy hydrocarbon material and the solvent), a viscosity of the solution that results from the heavy hydrocarbon dissolving in the solvent, and a type of the solvent used in forming the heavy hydrocarbon solution. In some embodiments, a ratio of the hydrocarbon material to the solvent can be approximately in the range of about 1:4 to about 1:399, and in some exemplary embodiments the ratio is approximately 1:13, approximately 1:27, or approximately 1:67. A person skilled in the art will recognize that, alternatively, the value of the amount of hydrocarbon material to the amount of solvent can be expressed in terms of weight percent (wt %), such as the amount of heavy hydrocarbon material as compared to solvent can be approximately in the range of about 10 wt % to about 60 wt %, and in some exemplary embodiments the value can be about 10 wt %, about 15 wt %, about 20 wt %, about 25 wt %, about 30 wt %, about 35 wt %, about 40 wt %, about 45 wt %, about 50 wt %, about 55 wt %, or about 60 wt %.

After the heavy hydrocarbon(s) has been dissolved to a suitable state, thus forming a heavy hydrocarbon solution 104, the solution can be cast onto a substrate 106 to form a film 108. For example, the solution 104 can be cast at least two different ways—spin-coating (or spin-casting) and spray coating—but a person skilled in the art, in view of the present disclosures, will understand several other ways by which a solution can be cast onto a substrate. These include, but are not limited to dip coating, slot-die coating, blade casting, line casting, drop casting (with or without ultrasonic dispersion), solution casting on support that can be dissolved (e.g., NaCl), inkjet printing, and Mayer/wound rod rolling.

Parameters that can be adjusted to impact the film that results from casting the heavy hydrocarbon solution on a substrate will depend, at least in part, on the action performed to do the casting. For example, parameters controlled when the casting is done by spin-coating can be different than parameters controlled when the casting is done by spraying. A person skilled in the art, in view of the present disclosures, will understand the various parameters that can be controlled when casting to impact the resulting film, and such parameters are within the scope of the present disclosure. By way of non-limiting examples, parameters that can be controlled when casting to impact the resulting film include but are not limited to: a concentration of the hydrocarbon solution cast onto the substrate (alternatively referred to as a thickness in some instances); a rotation speed of a casting device that casts the heavy hydrocarbon solution onto the substrate; an acceleration speed of a casting device that casts the heavy hydrocarbon solution onto the substrate; a speed at which the substrate moves with respect to a speed at which a casting device that casts the heavy hydrocarbon solution onto the substrate moves; an applied pressure on the heavy hydrocarbon solution as applied by a casting device that casts the heavy hydrocarbon solution onto the substrate; dimensions of a spraying nozzle when spraying the heavy hydrocarbon solution onto a substrate; and dimensions of a wound rod wire when performing the Mayer/wound rod rolling technique to apply the heavy hydrocarbon solution onto a substrate.

More generally, a person skilled in the art, in view of the present disclosures, will understand the various dimensions and configurations of a tool doing the casting (also referred to as a casting device or deposition tool, among other terms known to those skilled in the art), and will understand how those dimensions and/or configurations can be adjusted to achieve desired film thicknesses in view of the present disclosures. Dimensions include, but are not limited to, a wound rod size and a size of a nozzle aperture, and configurations include, but are not limited to, a height of a blade or nozzle. By way of non-limiting example, in some instances in which casting is performed by spin-coating, a concentration of the hydrocarbon solution can be approximately in the range of about 1000 nanometers to about 8000 nanometers using an approximately 60 wt % solution with speeds of the drop casting device operating approximately in the range of about 1500 revolutions per minute to about 5000 revolutions per minute. By way of further non-limiting example, a concentration of the hydrocarbon solution can be approximately in the range of about 10,000 nanometers to about 40,000 nanometers when casting is performed by drop casting.

The type of substrate 106 that is used in conjunction with heavy hydrocarbon solution 104 can vary based on the desired properties of the final film. For example, while glass and quartz can be used, a person skilled in the art, in view of the present disclosures, will understand several other materials that can be used as a substrate in this context, including but not limited to silicon, poly(methylmethacrilate), polydimethylsiloxane, polyethylene terephthalate, polycarbonate, polypropylene, polyimide, polyethylene naphthalate, polyethersulfone, polyurethane, and cleaved crystals that can be dissolved in water or other non-solvent for the films (e.g., NaCl). As shown, the substrate 106 can include a slide or disk that can collect the heavy hydrocarbon solution on a surface thereof. Moreover, while the substrates are described as "slides" (e.g., glass slides) or "disks" (e.g., quartz disks), a person skilled in the art, in view of the present disclosures will understand many different structures, shapes, sizes, and configurations can be used for the substrate, depending, at least in part, on the eventual application in which the resulting film will be used.

FIG. 1d illustrates annealing of the film 108 on the substrate 106 to form the thin film 110. Annealing can also be performed in a variety of ways, including a high temperature furnace anneal, but, in some embodiments, it can involve laser scribing, writing higher conductivity areas in a predefined pattern, as discussed in greater detail below. As shown, annealing the film 108 can burn off the SCT, making the resulting thin film 110 thinner and darker. In some embodiments, a resolution used in such laser scribing can be approximately in the range of about 0.0005 inches to about 0.01 inches, and in some exemplary embodiments the resolution is approximately 0.001 inches. In such instances, the unpatterned area can be easily removed, allowing for transparent conductive patterns to be written on a surface, with the potential for applications such as transparent heating bars on windshields. Although laser ablation spots can generate extreme high local temperature (e.g., over approximately 1400° C.) within a sub-millisecond time scale, the substrate can be maintained approximately at room temperature. This can also allow the coating to be applied to flexible substrates that may not otherwise survive a high temperature furnace anneal. Further, in some instances, annealing can be performed using lasers with the same spatial resolution to produce transparent, more conductive films.

Parameters that can be adjusted to impact the film that results from annealing will likewise depend, at least in part, on the action performed to do the annealing. For example, parameters controlled when performing a high temperature furnace anneal can be different than parameters controlled when the annealing is done using lasers. A person skilled in the art, in view of the present disclosures, will understand the various parameters that can be controlled when annealing to impact the resulting film, and such parameters are within the scope of the present disclosure. By way of non-limiting examples, parameters that can be controlled when casting to impact the resulting film include but are not limited to: a temperature of the environment in which the annealing occurs; a length of time for which the annealing occurs; heating and/or cooling rates; a surrounding environmental pressure; insertion/extraction times during loading the film into a hot reactor; laser power density, which can be controlled through filtering or defocusing, for example; and rastering times. For instance, in some exemplary embodiments in which a high temperature furnace is used to do the annealing, a temperature of the environment can be approximately in the range of about 400 degrees Celsius to about 1200 degrees Celsius, and in some exemplary embodiments the temperature is approximately 1000 degrees Celsius.

In some embodiments, the film can be annealed in an argon atmosphere at a range of temperatures up to about 950 degrees Celsius to produce the thin film. It will be appreciated by a person skilled in the art that this is significantly lower than the temperatures that produces carbon black, which can be in a range of approximately 1300 degrees Celsius to approximately 1600 degrees Celsius). Further, while an argon atmosphere is described above, a person skilled in the art will recognize other atmospheres that can be used, such as a nitrogen atmosphere, a helium atmosphere, a neon atmosphere, a krypton atmosphere, a xenon atmosphere, a high vacuum atmosphere (e.g., approximately in the range of about $10^{-1}$ Pascals to about $10^{-7}$ Pascals), or an ultrahigh vacuum atmosphere (e.g., below approximately $10^{-7}$ Pascals). By way of further non-limiting example, in some exemplary embodiments in which a high temperature furnace is used to do the annealing, a length of time for which the annealing occurs can be approximately in the range of about 5 minutes to about 120 minutes, and in some exemplary embodiments the length of time is approximately 30 minutes. By way of still further non-limiting example, in some exemplary embodiments in which a high temperature furnace is used to do the annealing, a heating/cooling rate can be approximately in the range of about 1 degrees Celsius per minute to about 50 degrees Celsius per minute, and in some exemplary embodiments the heating/cooling rate can be approximately 20 degrees Celsius per minute.

A thickness of the resulting thin film 110 can be varied based on the relative proportions of the heavy hydrocarbon 104 and the solvent used to form the heavy hydrocarbon solution 104. For example, by varying the concentration of the SCT solution, a thickness of the final thin film 110 can be varied over a range of hundreds of nanometers. In some instances, a thickness of the resulting thin film 110 is approximately in the range of about 30 nanometers to about 500 nanometers after annealing, and in some embodiments, it is approximately 300 nanometers after annealing, which can be considered to be "thin" in the context of the present disclosure. A thickness of the film 110 prior to annealing can be approximately in the range of about 1000 nanometers to about 5000 nanometers. Still further, to the extent the present disclosure provides that the resulting film is "smooth" or "substantially smooth," the film is considered to be smooth or substantially smooth provided that no portion of the outer surface is more than approximately 10% different in height with respect to a common plane that extends through the entire surface of the film and is substantially parallel to a flat, ground surface. A person skilled in the art will recognize other metrics can be used to determine a smoothness of a film or other material without departing from the spirit of the present disclosure, and in at least some instances such metrics can vary depending on the film thickness. These metrics include, among others, a mean average of the film (Ra) and a root mean squared average of the film (RMS). A value of Ra or RMS would be very different for a film that is 10 nanometers thick as compared to a film that is 500 nanometers thick. Likewise, to the extent the present disclosure provides that the resulting film is "homogeneous," the film is considered to be homogeneous provided that it contains no more than 5% of a material that is not the heavy hydrocarbon solution that results from dissolving the heavy hydrocarbon(s) in the solvent.

Figure 2A:
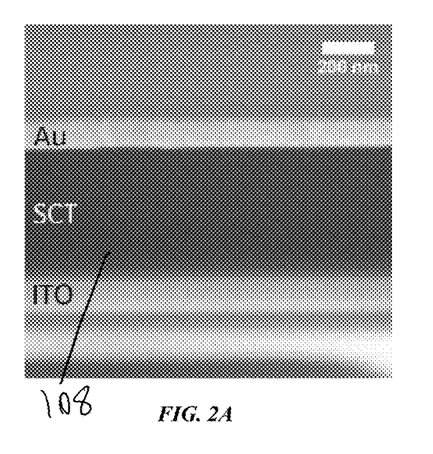
FIG. 2A is a magnified cross-sectional view of one exemplary embodiment of an unannealed SCT film manufactured by the process of FIGS. 1a-1d.
Figure 2B:
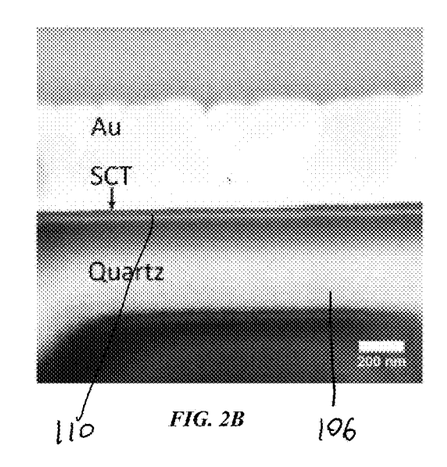
FIG. 2B is a magnified cross-sectional view of one exemplary embodiment of an annealed SCT film manufactured by the process of FIGS. 1a-1d.

FIGS. 2A and 2B illustrate contrasting images of the SCT film before and after annealing. As discussed above, the surface of the substrate 106 can be smooth such that the thin films 110 are highly uniform and homogeneous. For example, the SCT films 108 are smooth and uniform over the whole sample, both before and after annealing, with example RMS roughnesses of approximately 13 nanometers and approximately 11 nanometers, respectively. These roughness values represent an upgrade over films produced from ball-milled coal nanoparticles, where film performance was limited by the numerous cracks and voids present in the film after spin coating, which were then amplified by annealing. As shown, the unannealed film 108 includes a thick layer of SCT sandwiched between a layer of gold (Au) and indium tin oxide (ITO) on a substrate. Following annealing, as shown in FIG. 2B, the thin film has a significantly thinner layer of SCT thereon.

Figure 3:
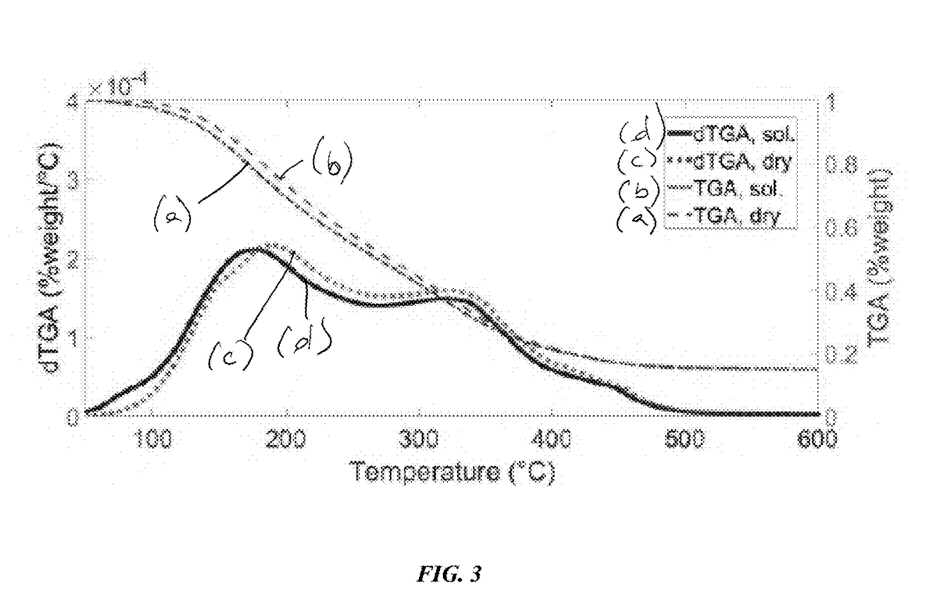
FIG. 3 is a graph illustrating a thermogravimetric analysis of sample of SCT in various states.

FIG. 3 illustrates a thermogravimetric analysis (TGA) of the annealed thin film 110 to show the decrease in film thickness. When annealed, the SCT films lose large amounts of mass, which can be correlated with a large loss in film thickness, as shown in FIG. 2B above. In some embodiments, a thickness of the thin film can be decreased by as much as about 95%. The graph includes the TGA of a dried SCT sample (a), a defluxed and solvated SCT sample (b), and differential TGAs of a dried SCT sample (c), and a defluxed and solvated SCT sample (d).

As shown, samples (c) and (d) have two main peaks that occur approximately between about 175 degrees Celsius to about 190 degrees Celsius and around 325 degrees Celsius that correspond to the loss of the one- and two-ring aromatic molecules, respectively. Expected percentages of core sizes in these SCT samples are approximately in the range of about 35% to about 50% for the one-ring and approximately in the range of about 35% to about 55% two ring molecules, which corresponds to the overall mass loss observed in the TGA. The smaller feature at approximately 450 degrees Celsius could similarly be the loss of some or all of the three-ring cores. Further, sample (d) exhibits an extra shoulder approximately between about 60 degrees Celsius and about 100 degrees Celsius, illustrating that the spin coated films retain some solvent due to the high aromatic content of the SCT, which can lead to high polarity regions of pi-pi molecular stacking that can trap polar solvent molecules like dichloromethane (DCM) in a manner analogous to hydrogen bonding. This should typically be heated to above the solvent boiling point to be removed, contributing to the mass loss upon annealing.

The thin films of the present disclosure provide for objects in which the resulting thin films 110 can be used. One such example is a transparent heater, or Joule heater, that includes the substrate 106 and the thin film 110 coupled to the substrate, where the transparency of the film and the sheet resistance are tuned to specific parameters such that the transparent heater operates optimally. SCT films can be formed into Joule heaters in a variety of ways. For example, in some embodiments, metal contacts can be sputtered onto SCT films on quartz disks that had been annealed at approximately 950 degrees Celsius. As mentioned above, SCT devices can be air stable over the whole range of temperatures, unlike comparable temperature transparent heaters that may require encapsulation.

A person skilled in the art will appreciate that the processes of the instant disclosure enable control of various parameters in the process, which in turn allows for various parameters of the resulting film to be controlled. The resulting parameters that are controlled can be dependent, at least in part, on the application in which the resulting film will be used. For example, where a level of transparency may be important for use of the resulting film in the context of a windshield, the level of transparency may be not be as important, or possibly wholly irrelevant, for use of the resulting film in the context of de-icing a wing on a plane. Non-limiting examples of parameters of the resulting film that can be controlled by one or more parameters associated with each step of the process includes but is not limited to: electrical conductivity of the film, an optical transparency of the film, a uniformity of the film (i.e., how smooth is it across its surface area), structural integrity and/or stability of the film (i.e., the ability of the film to sustain bending, twisting, stretching, and compressing without structural failure, such as fracture, delaminating, etc.), and chemical resilience of the film (i.e., how it holds up vis-à-vis acids, oxidizers). For example, by controlling solution concentrations, annealing temperatures, conductivity, and other process parameters over orders of magnitude, high quality thin films with a wide range of transparencies, e.g., approximately in the range of about 23% to about 93%, and sheet resistances, e.g., approximately in the range of about 2.5 ohms to about 1.2 kilo-ohms, can be produced.

In some exemplary embodiments, a transparency of a resulting film is at least approximately 70%, and can be even better. For example, it can be at least approximately 75%, at least approximately 80%, at least approximately 85%, at least approximately 90%, and at least approximately 95%, where the percentage is the amount of visualization that is preserved vis-à-vis an unobstructed view (i.e., 100%=full transparency and 0%=fully opaque). Accordingly, the transparency value provides for an amount of light of a given wavelength (e.g., approximately 500 nanometers, where the human eye can be considered to be most sensitive) that passes through the film unabsorbed. Once the temperature reaches approximately 500 degrees Celsius, most of the mass loss has finished, but overall transmittance continues to decrease due to the lowering bandgap. This decrease can continue to the films annealed at approximately 950 degrees Celsius, with films coated from a solution of about 100 mg/ml decreasing to about 23% transparency with thicknesses of approximately tens of nanometers. However, since initial film thickness can be controlled via the solution concentration, films with transparencies over about 93% can be achieved even after annealing at approximately 950 degrees Celsius.

In some exemplary embodiments, a conductivity of a resulting film, also referred to herein as a sheet resistance, can be approximately in the range of about 1000 ohms per square to about 30,000 ohms per square, or more generally referred to as approximately 30,000 ohms per square or less, although factors such as equipment used in conjunction with the resulting film an impact these values. A person skilled in the art will recognize that annealing the film between approximately 600 degrees Celsius and approximately 950 degrees Celsius can result in an increase in carbon bond disorder and a rapid conversion to an aromatic-rich, highly interconnected a-C framework with significantly lower sheet resistance, with aromatic domain size increasing with temperature. SCT films annealed at 950 degrees Celsius, in addition to increasing a size of the largest aromatic cores by roughly 25%, have significantly lower sheet resistances, showing that sheet resistance can be tuned both by annealing temperature and by coating parameters such as solution concentration. The significant reduction in sheet resistance upon high temperature annealing derives from a change in the SCT chemical composition.

There are many advantages and improvements that result from the present disclosure as compared to existing methods, devices, and materials. For example, the negative cost of the carbon feedstock (or other material) provides a significant advantage over other conductive materials and/or transparent conductive materials, which have high materials or processing costs. Further, the commercially available SCT provides the ability to make conformal, highly robust coatings just tens of nanometers thick from solution processing techniques. A person skilled in the art will recognize that while a certain faction of SCTs is composed of PAHs, which can be a health hazard in powder form or in soot given their potential to be aerosolized, SCT is an extremely viscous and inherently non-volatile liquid with no risk of exposure to its constituents. During processing, the PAHs are solvated and safe to use in normal lab or manufacturing conditions before deposition, and once deposited and annealed are bound to a substrate in a solid film, with the PAHs in question fused into larger, non-volatile clusters.

Moreover, the fabricated transparent heaters that result from the present disclosures show stability at much higher temperatures than the state-of-the-art alternative, silver nanowires. The solution-based processing also allows conformal coating on arbitrary surfaces, with final thicknesses controllable down to the nanoscale. The ease of patterning with laser annealing allows for arbitrarily complex patterns to be written in conductive carbon. For example, reducing the resistivity of the final films would improve both the maximum temperatures and heating rates, and could potentially be achieved via optimizations in processing or methods to increase the average aromatic cluster sizes. A comparison of performance of various transparent heaters from literature and two commercial heaters can be found in Table 1, below. As shown, heating performance and transmission of the transparent heaters, as compared to commercial heating products, illustrates a favorable range of transparency and maximum temperature with no degradation, among other favorable factors afforded by the present disclosures.

imide can allow for the integration of low cost disposable electronic circuits with features including energy harvesting, consumption, and/or storage components. As conductors, the potential for size scalability during film processing that results from the present disclosures allows for rapid integration in roll-to-roll processes, such as for applications needed for touchscreens, next generation roll-to-roll photovoltaic panels, etc. In some exemplary embodiments, an energy density of a resulting film is at least approximately 4.3 $J/m^2$, and can be even better. For example, it can be at least approximately 5 $J/m^2$, at least approximately 10 $J/m^2$, at least approximately 15 $J/m^2$, at least approximately 20 $J/m^2$, or even greater.

Both the unannealed and annealed sections of the thin films 110 can be laser annealed to form one or more patterns, including what are described as arbitrarily complex pattern,

| Material | % T | Max T [° C.] | Voltage [V] | Rate [° C. $s^1$] | T/V [° C. $V^1$] | Ref. |
|---|---|---|---|---|---|---|
| $AgNW_8$ | 81.8 | 41 | 5 | 1.5 | 3.2 | [39] |
| $AgNW_8$ | 92 | 140 | 7 | 0.8 | 16.4 | [40] |
| $AgNW_8$ | 90 | 55 | 7 | 2.0 | 4.3 | [39] |
| $AgNW_8$ | 75 | 93 | 4 | 0.2 | 17.0 | [25] |
| $AgNW_8$ | 90 | 100 | 7 | 1.3 | 10.7 | [52] |
| Composite | 74.1 | 99 | 40 | 1.1 | 1.9 | [41] |
| Composite | 86.4 | 230 | 13 | Not reported | 15.8 | [42] |
| rGO | 34 | 206 | 60 | 7.0 | 3.0 | [43] |
| rGO | 53 | 150 | 60 | 7.0 | 2.1 | [43] |
| rGO | 81 | 42 | 60 | 0.7 | 0.3 | [43] |
| Graphene | 89 | 100 | 12 | 0.8 | 6.3 | [27] |
| Graphene | 87 | 65 | 12 | 0.5 | 3.3 | [27] |
| Graphene | 85 | 55 | 40 | 0.3 | 0.8 | [44] |
| $CNT_8$ | 83 | 77 | 15 | Not reported | 3.5 | [45] |
| $CNT_8$ | 79 | 95 | 12 | 0.9 | 5.8 | [46] |
| $CNT_8$ | 95 | 47 | 60 | 0.4 | 0.4 | [47] |
| ITO | 95.6 | 31.4 | 12 | 0.1 | 0.5 | [27] |
| FTO | 88 | 39 | 12 | 0.0 | 1.2 | [48] |
| Metal Grid | 77 | 170 | 8.5 | 1.2 | 17.1 | [49] |
| Metal Grid | 86 | 100 | 5 | 1.9 | 15.0 | [50] |
| Metal Grid | 74 | 86 | 5 | 3.1 | 12.2 | [51] |
| Polymer | 87.8 | 114 | 10 | 1.2 | 8.9 | [26] |
| Polymer | 90.1 | 45 | 10 | 0.2 | 2.0 | [26] |
| Commercial (Composite) | 82 | 120 | Not available | Not available | Not available | [53] |
| Commercial (ITO) | 90 | 100 | Not available | Not available | Not available | [54] |
| Coal | 25 | 285 | 60 | 2.2 | 4.3 | [4] |
| SCT | 23.1 | 279.3 | 60 | 4.2 | 4.2 | This work |
| SCT | 46.9 | 174.2 | 60 | 2.5 | 2.5 | This work |
| SCT | 72.2 | 72.1 | 60 | 0.8 | 0.8 | This work |
| SCT | 84.7 | 31.6 | 60 | 0.1 | 0.1 | This work |
| SCT | 93.3 | 29.2 | 60 | 0.1 | 0.1 | This work |

The present disclosure can be used across a variety of industries. Coal-based thin films are active materials for joule heaters due to their high thermal resilience and stability while reaching sustained temperatures in excess of about 300 degrees Celsius. Having sheet resistances similar to those of much thicker coal-based films, while also being transparent, SCT thin films are promising candidates for transparent heating, offering the strengths of coal-based films with simpler processing. For example, applications for transparent conductors are numerous, and include transparent heaters for windshield or airplane de-icing, either as a full transparent coating or as a reduced area pattern on the surface. In biomedical applications, highly temperature resilient thin films can be used for sample pre- and post-measurement processing, sensor cleaning, etc. Additional applications can include heating electronic devices such as LCD screens in cold environments, or more generally windows, such as in buildings and other structures, or displays, such as computer or television monitors/displays.

Laser patterning electrodes on versatile flexible substrate such as polyethylene terephthalate (PET), paper, and polyto create patterned transparent heaters. An arbitrary complex pattern can include a combination of one or more geometrical shapes of varying sizes, interconnected with high form-factor elements (e.g., linear lines, circular lines), including interdigitated shapes. In some embodiments, the SCT films can be patterned using a direct write laser patterning process in lieu of, or in addition to, annealing. As mentioned above, furnace annealed SCT films have uniform surfaces, which are essential for many electronic devices. However, the furnace size will limit the process sample size, which depending on the application can become a bottleneck for large scale manufacturing. Laser direct printing expands the processing opportunities for SCT films, and can shed light on their chemistry and further potential applications. The localized heating caused by the laser can be well in excess of the approximately 950 degrees Celsius used in the furnace, but without the need for high temperature substrates, allowing potential applications on lower melting point and flexible substrates such as polyimide as with laser induced graphitization (LIG) films.

Figure 4:
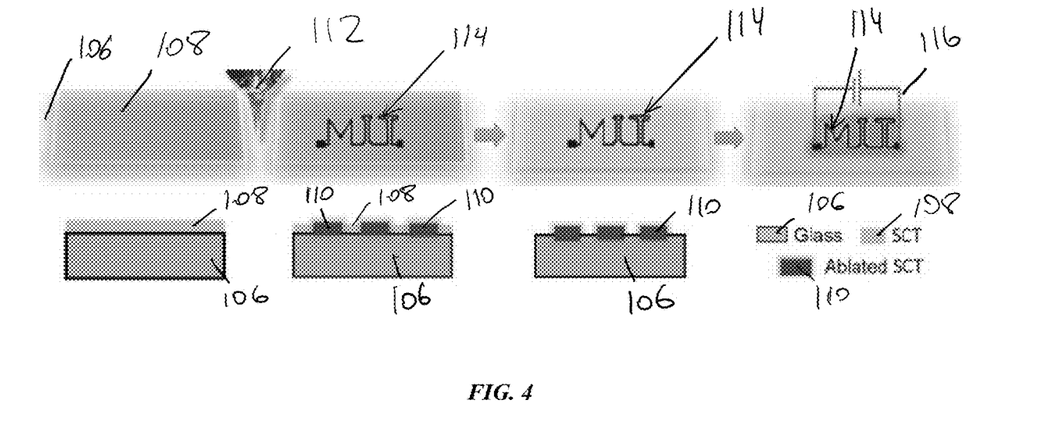
FIG. 4 is a schematic of one embodiment of a direct-write laser patterning process for SCT films.

FIGS. 4a-d illustrate one exemplary embodiment of a direct write laser patterning process for SCT films. As shown in FIGS. 4a-4b, the SCT film 108 can be placed on the substrate 106, e.g., glass, and annealed in a predefined pattern by a commercial laser cutter 112. Due to ablation of the film 108 by the laser, thicker films are useful as a starting point, though in some embodiments, the presently disclosed processes can be used on thinner films. For example, drop cast films (from SCT dissolved in N-Methyl-2-pyrrolidone (NMP), with a concentration of about 10 wt %) can be ablated by a $CO_2$ laser cutter with a spot size of around 25 µm. The laser pulse can generate up to about 2600K locally with just 2W incident power on commercial polyimide tape. The local high temperature enables carbonization of PAHs in SCT films in an ambient environment. Arbitrary patterns 114 can then be directly printed on the film 108, as shown in FIG. 4b, to form an ablated thin film 110 with unpatterned portions of the film remaining unannealed.

After annealing the predefined pattern, the unexposed regions can then be washed away, leaving a conductive pattern of annealed SCT 110, as shown in FIG. 4c. Annealing predefined patterns can make SCT films more useful for applications where the maximum visibility possible is desirable, as the minimum area necessary for heating can be patterned with an SCT heater and the remaining area can be left uncovered. Annealing predefined patterns can also increase the feasibility of large-scale manufacturing of SCT heaters, as laser patterning could be easily integrated on production lines. Once the unannealed sections have been removed, metal electrodes 116 can be placed across the film 110, and a voltage can be placed across the electrodes to heat the heater. A person skilled in the art will recognize that an amount of voltage that is needed to operate a Joule heater or other application in which the resulting film is operated will depend, at least in part, on the desired application. In some exemplary embodiments, an amount of voltage applied to the resulting film to cause it to become heated can be approximately in the range of about 5 Volts to about 60 Volts, and in some exemplary embodiments it can be approximately 60 Volts, or 60 Volts or less.

The films resulting from the present disclosures can be used as part of a Joule heater, as mentioned above. Either separately, or as part of a Joule heater, the films can be incorporated into a variety of applications where a thin heating element is desirable, which can include applications where transparency and/or the ability to melt (e.g., ice) can be important, at least some of which are described herein. By way of non-limiting examples, such Joule heaters can be incorporated into: windows, including but not limited to car windshields, windows of buildings and other structures, including windows intended to be heated, skylights, and/or sun/moon roofs; a shell of an airplane (i.e., the combination of the fuselage, wings, and horizontal and vertical stabilizers); the housings, exteriors, and/or related components of other modes of transportation; lights (e.g., head and tail lights of a vehicle or other mode of transportation); mirrors; screens and displays, such as for computers, televisions, smartphones or other cellphones, tablets, etc., whether for indoor use, outdoor use, or both; watch displays; lighting fixtures (e.g., for various modes of transportation, including but not limited to airplane lighting, as well as buildings); LEDs; signage; cylindrical objects; boat components; and SCT-based transparent heaters). Such usages are a result of the effectiveness in heating, transparency, and/or flexibility of the resulting films, among other benefits afforded by the present disclosures.

Experimental Examples

Materials and chemicals: Samples of defluxed SCT were obtained from ExxonMobil Research and Engineering Company, and DCM 99.8% purity was obtained from Sigma Aldrich.

Thin film synthesis: SCT was dissolved in DCM in concentrations from approximately 3.3-100 mg/mL. Solutions of SCT in DCM were spin coated at approximately 2000 rpm for approximately 20 s onto quartz disks using a Laurell WS series spin coater. Annealing was performed in a quartz tube under argon flow for about 30 minutes at a range of temperatures using a Lindberg/Blue temperature controller. SCT dissolved in N-Methyl-2-pyrrolidone (NMP) with a concentration of about 10 wt % was drop cast onto glass slides and dried on a hot plate at about 80 degrees Celsius to make a uniform thin film. Laser annealing was performed using a Universal Laser VLS 2.30 with a peak power output of about 33 W and percentage powers referenced to this value, with each pulse at sub-millisecond timescales and the scan speed set at about 127 mm $s^{-1}$.

Characterization: Samples of defluxed SCT as received, as well as samples solvated in DCM and then dried for several days under vacuum, were tested using TGA up to about 950 degrees Celsius. UV-Vis-NIR measurements were performed using a Perkin Elmer Lambda 1050 UV/VIS/NIR Spectrophotometer.

Film thicknesses were measured using a Bruker DXT Stylus Profilometer and cross sectional SEM performed on an FEI Helios 600. Sheet resistances were measured using a CDE ResMap 4-Point Probe. Temperature measurements were performed using Raman measurements were performed using a Horiba LabRam 800HR.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for producing a film, comprising:
dissolving a heavy hydrocarbon material in a solvent to form a heavy hydrocarbon solution, the heavy hydrocarbon material having one or more molecules with a boiling point of 340 degrees Celsius or greater;
casting the heavy hydrocarbon solution onto a substrate to form a film; and
annealing the film, and
wherein at least a portion of the solvent remains in the heavy hydrocarbon solution that forms the film, and
wherein an amount of heavy hydrocarbon material as compared to solvent of the hydrocarbon solution is in approximately a range of about 25 wt % to 60 wt %.

2. The method of claim 1, wherein annealing the film occurs at a temperature approximately at or greater than about 600 degrees Celsius and in the presence of oxygen.

3. The method of claim 1, wherein the heavy hydrocarbon comprises one or more petroleum byproducts.

4. The method of claim 3, wherein the one or more petroleum byproducts comprise steam cracker tar.

5. The method of claim 1, further comprising:
forming at least one conductive pattern in the annealed film.

6. The method of claim 5, wherein forming at least one conductive pattern in the annealed film is performed by operating a laser, and the at least one conductive pattern is an arbitrarily complex pattern.

7. The method of claim 1, wherein an amount of heavy hydrocarbon material as compared to solvent of the hydrocarbon solution is in approximately a range of about 25 wt % to 60 wt %.

8. The method of claim 1, wherein the annealing is performed using a laser.

9. The method of claim 2, wherein annealing the film further comprises changing the chemical structure of the film.

10. A Joule heater, comprising:
a substrate; and
a thin, conductive film coupled to the substrate, the film comprising a heavy hydrocarbon solution having a heavy hydrocarbon in a solvent,
wherein a transparency of the film is at least 70%,
wherein at least a portion of the solvent remains in the heavy hydrocarbon solution that forms the film,
wherein the heavy hydrocarbon has one or more molecules with a boiling point of 340 degrees Celsius or greater and an amount of heavy hydrocarbon material as compared to solvent of the hydrocarbon solution is in approximately a range of about 25 wt % to 60 wt %, and
wherein a sheet resistance of the film is in the range of about 1,000 ohms per square to about 30,000 ohms per square.

11. The Joule heater of claim 10, further comprising:
one or more electrodes coupled to the film, the one or more electrodes being configured to raise in temperature when a voltage is placed across the one or more electrodes.

12. The Joule heater of claim 10, wherein the heavy hydrocarbon comprises one or more petroleum byproducts.

13. The Joule heater of claim 12, wherein the one or more petroleum byproducts comprise steam cracker tar.

14. The Joule heater of claim 10, wherein the film has at least one conductive pattern formed therein.

15. The Joule heater of claim 14, wherein the at least one conductive pattern is a laser-formed arbitrarily complex pattern.

16. The Joule heater of claim 10, wherein a thickness of the film is in the range of about 10 nanometers to about 500 nanometers.

17. The Joule heater of claim 10, wherein a transparency of the film is at least 85%.

18. The Joule heater of claim 10, wherein an energy density of the film is at least 4.3 $J/m^2$.

19. The Joule heater of claim 10, wherein an output temperature of the Joule heater is in the range of about 100 degrees Celsius to about 288 degrees Celsius.

20. The Joule heater of claim 10, wherein the Joule heater is operated at 60 Volts or less.

* * * * *